United States Patent [19]

Balzer et al.

[11] 4,324,303
[45] Apr. 13, 1982

[54] EQUALIZER BAR SUPPORT ASSEMBLY

[75] Inventors: David J. Balzer, East Peoria, Ill.; Orville E. Kessinger, Blue Grass, Iowa

[73] Assignee: Caterpillar Tractor Co., Peoria, Ill.

[21] Appl. No.: 136,623

[22] PCT Filed: Feb. 5, 1980

[86] PCT No.: PCT/US80/00124
§ 371 Date: Feb. 5, 1980
§ 102(e) Date: Feb. 5, 1980

[87] PCT Pub. No.: WO81/02277
PCT Pub. Date: Aug. 20, 1981

[51] Int. Cl.³ .............................................. B62D 55/00
[52] U.S. Cl. ........................................ 180/9.5; 305/31
[58] Field of Search ....................... 180/9.5, 9.52, 9.54, 180/9.56, 9.58, 9.6; 305/31, 22

[56] References Cited
U.S. PATENT DOCUMENTS 3,963,047  6/1976  Moring ................................ 91/432
4,018,295  4/1977  Hasselbacher ....................... 180/9.5
4,088,377  5/1978  Corrigan .............................. 305/31

Primary Examiner—Joseph F. Peters, Jr.
Assistant Examiner—Donn McGiehan
Attorney, Agent, or Firm—Wegner, Stellman, McCord, Wood & Dalton

[57] ABSTRACT

An equalizer bar support assembly has an equalizer bar (14) mounted on a bearing (24) carried by a flanged bearing support (25) on a track roller frame (16). A support plate (98,150) is attached to one end portion of the flanged bearing support (25). In one embodiment, a bulkhead (100) having a ring portion (130) is bolted to the support plate (98) so that the ring portion (130) is wedged between a tapered outer circumference (120) of the support plate (98) and a contact surface (140) of a support member (78) of the track roller frame (16). The support plate (98) is firmly secured to the roller frame (16) and yet is readily removable therefrom. In another embodiment, the support plate (150) has a means (164) thereon to limit the axial movement of the support plate (150) relative to the roller frame (16) during the application of force to remove the support plate (150) from the track frame (16).

10 Claims, 9 Drawing Figures

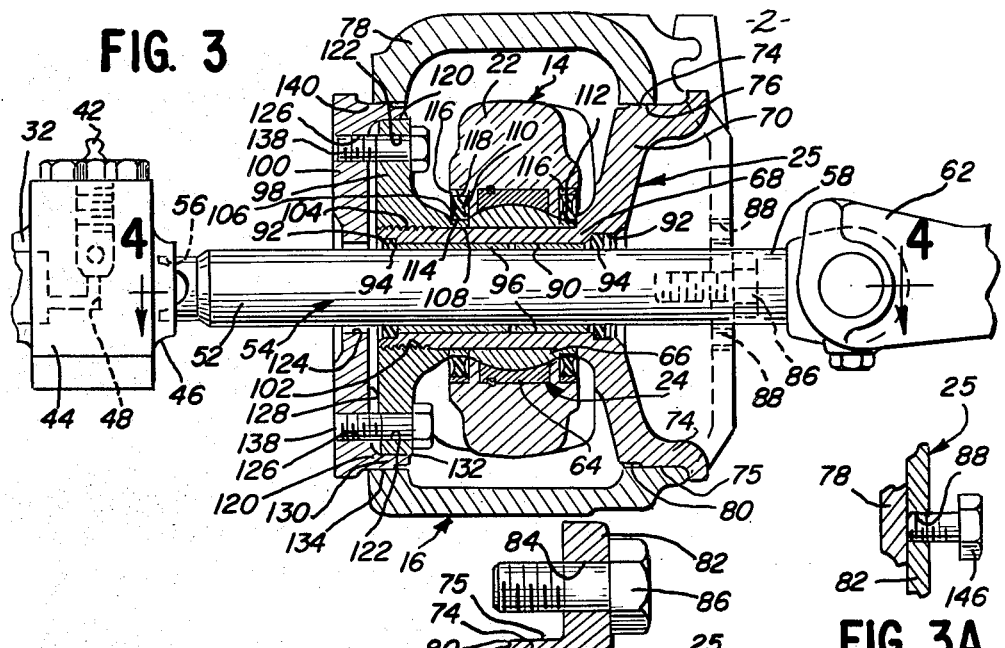
FIG. 3
FIG. 3A
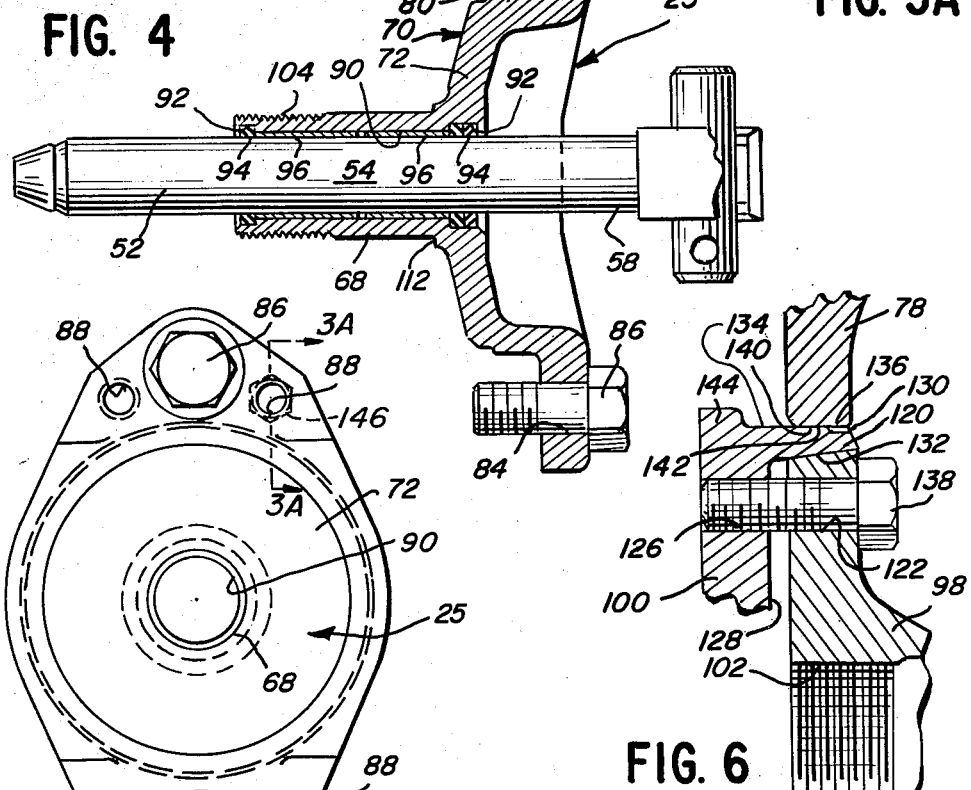
FIG. 4
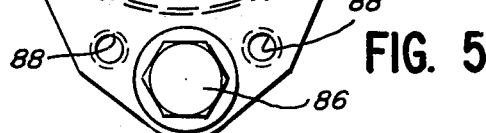
FIG. 5
FIG. 6

EQUALIZER BAR SUPPORT ASSEMBLY

DESCRIPTION

1. Technical Field

This invention relates to a support assembly for supporting an equalizer bar on a track frame in a tracked vehicle.

2. Background Art

Many tracked vehicles have support apparatus for attaching and supporting an equalizer bar on a track frame. Such apparatus commonly have an end portion of the equalizer bar rotatably attached to the track frame through a spherical bearing and a bearing support. The bearing support has one end portion secured to the track frame and has another end portion connected to a support plate which is press fit to a spaced apart portion of said track frame. A typical construction is shown and described in the Hasselbacher U.S. Pat. No. 4,018,295, issued Apr. 19, 1977.

Although the prior apparatus effectively supports the equalizer bar on the track frame, difficulty is encountered in attempting to remove the support components which have been assembled by interference fits (press fit). Specifically, while disassembling the various components, the support plate, which has been pressed in the track frame, requires a large amount of force to free it. Often, this force is provided by using a valve housing, which is connected to a piston projecting from a cylinder of a track tensioner device, against the support plate. The support plate may be so firmly pressed into the track frame that large amounts of force must be applied by the piston and valve housing against the support plate before the support plate is freed. Occasionally, the support plate is so firmly pressed in the frame that the force generated by the piston compresses the tensioning spring in the track tensioner so that when the support plate does break loose from the track frame, the stored energy in the spring may propel the freed support plate from the track frame and the piston may inadvertently become separated from the track tensioner device requiring cleaning and reassembling before the new bearings can be installed in the track frame.

The present invention is directed to overcoming one or more of the problems as set forth above.

DISCLOSURE OF INVENTION

According to the present invention, a first embodiment of an equalizer bar support assembly has a push rod from a track tensioner device passing through a flanged bearing support which bearing support, in turn, is bolted to a track frame. A support plate having a tapered outer pheriphery is removably attached to the flanged bearing support. A bulkhead having an axially extending ring-shaped portion, the inner surface of which is tapered, is bolted to the support plate so that the ring-shaped portion is wedged between said tapered outer periphery of the support plate and an inner cylindrical surface of the track frame.

A further embodiment employs the use of a tang located on a support plate which support plate is press fitted into the inner cylindrical surface of the track frame. The tang is so shaped and sized as to limit the movement of the support plate within the assembly when the valve housing and piston of the track tensioner device is used to free the support plate from the track frame.

BRIEF DESCRIPTION OF DRAWINGS

FIG. 3 is an enlarged side elevational view, partially in section, of a portion of FIG. 2;

FIG. 3A is a partial cross-sectional view taken on line 3A—3A of FIG. 5 only with a bolt in position for moving parts relative to each other;

FIG. 4 is a cross-sectional view taken along the line 4—4 of FIG. 3 with parts broken away;

FIG. 5 is an elevational view of a flanged bearing support for use with the present invention;

FIG. 6 is an enlarged sectional view of the interfit between the track frame, the threaded support plate and the bulkhead of the present invention;

BEST MODE FOR CARRYING OUT THE INVENTION

Figure 1:
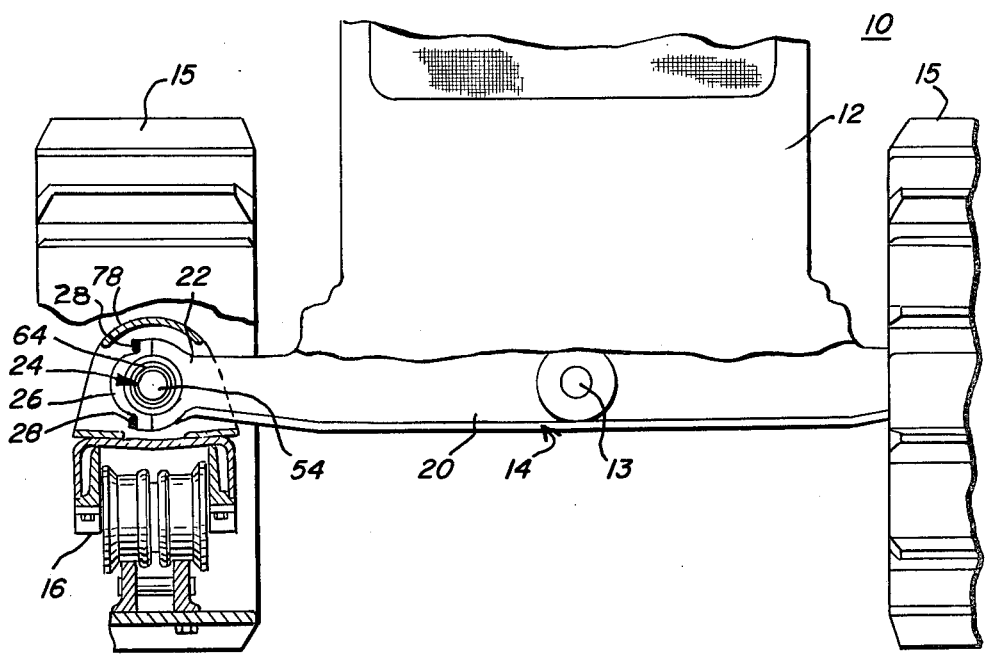
FIG. 1 is a front elevational view with parts broken away and in section of an equalizer bar mounted on a track frame of a tracked vehicle.

Referring to FIG. 1, a track-type vehicle 10 has a main frame 12 to which the midpoint of an equalizer bar 14 is attached. The equalizer bar 14 is positioned generally perpendicular to the vertical centerline of the vehicle 10. The vehicle 10 includes tracks 15 encircling track roller frames 16, disposed on either side of the main frame 12. Each end of the equalizer bar 14 is connected to a track roller frame 16 in a similar manner, hence, only one equalizer bar support assembly will be described in detail.

The equalizer bar 14 consists of a main body 20 pivotally secured at 13 to the main frame 12. Each end portion 22 of the equalizer bar 14 is mounted on a spherical bearing 24 carried by a flanged bearing support 25 on the track roller frame 16. An end cap 26 is secured by bolts 28 to the end of the equalizer bar 14 to attach the equalizer bar 14 in pivoting relationship to the track roller frame 16. A typical connection of the equalizer bar 14 to the bearing support 25 of the track roller frame 16 is shown and described in U.S. Pat. No. 4,018,295, issued Apr. 19, 1977, to the common assignee of the present invention.

Figure 2:
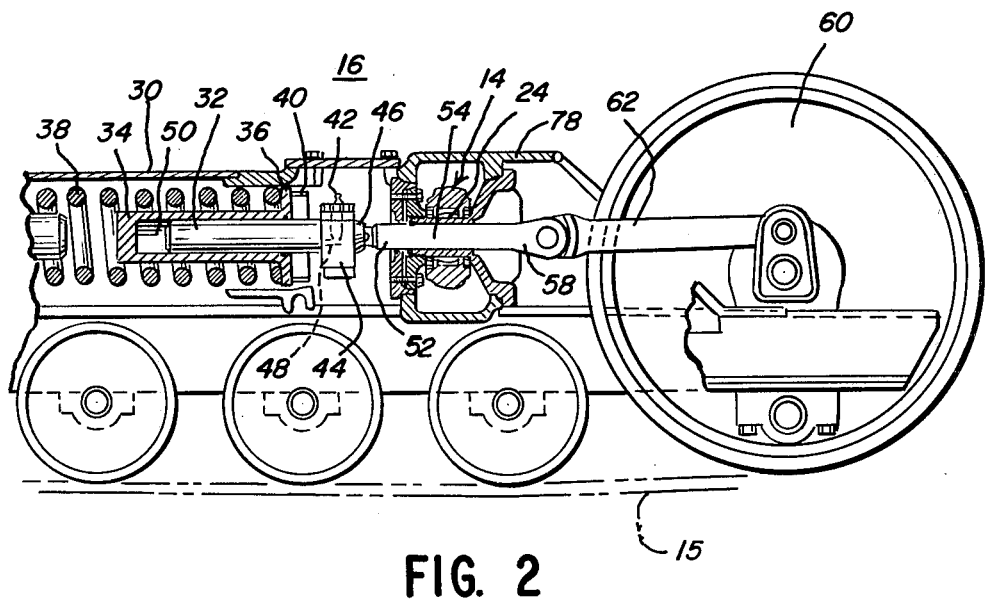
FIG. 2 is a side elevational view partially in section of the equalizer bar support assembly on the track frame of the present invention.

Referring now to FIG. 2 and, as is generally shown in U.S. Pat. No. 3,963,047, issued June 15, 1976, to the common assignee of the present invention, the track roller frame 16 includes various components to maintain proper tensioning of the track 15 as the vehicle 10 moves over uneven terrain. The track roller frame 16 includes a housing 30 in which a piston 32 is slidably positioned inside a cylinder 34 which has an outwardly flared abutment shoulder 36. One end of a helical spring 38 bears against the abutment shoulder 36 which, in turn, presses against a fixed shoulder 40 supported by the housing 30 of the track roller frame 16. The other end (not shown) of said spring 38 bears against the opposite end of said housing 30. A valve 42 is mounted in a valve body 44 carried by an outer portion 46 of the piston 32. The valve 42 communicates through passageways 48 in the valve body 44 with a cavity 50 in said cylinder 34. One end portion 52 of a push rod 54 is inserted into a mating recess 56 (see FIG. 3) in the outer portion 46 of the piston 32. The other end portion 58 of the push rod 54 is connected to an idler wheel 60 of the track roller frame 16 through a linkage 62. Proper track tensioning is achieved by injecting a non-compressible fluid, such as grease, through the valve 42 and passageway 48 into the cavity 50 of the cylinder 34 to force the piston 32 and the push rod 54 against the linkage 62 and the idler wheel 60 to take up any slack in the track 15 created by movement over the terrain.

Referring to FIG. 3, the spherical bearing 24 has an outer race 64 seated in the end portion 22 and cap 26 of the equalizer bar 14 and has an inner race 66 on an axially extending cylindrical portion 68 of the flanged bearing support 25. FIGS. 4 and 5, in particular, show two views of the flanged bearing support 25, with FIG. 4 illustrating only the push rod 54 and bearing support 25 viewed at right angles to FIG. 3.

The bearing support 25 has an axially facing flanged or cup-shaped body portion 70 which includes a disc-shaped wall 72 extending from the cylindrical portion 68 to a cylindrically-shaped wall 74 having a radially outwardly facing peripheral surface 75 seating in an inwardly facing cylindrical opening 76 formed in one portion of a support member 78 of the track frame 16. The cylindrical wall 74 has a step or undercut 80 at the axially inner portion of the peripheral surface 75 thereof to serve as a pilot portion for guiding the bearing support 25 into the cylindrical opening 76 during initial assembly of the bearing support 25 to the support member 78 of the track roller frame 16. The cylindrical wall 74 has a radially extending mounting lip or flange 82, which lip or flange 82 is generally elliptical in shape (see FIG. 5). In the vicinity of each focus of the elliptical-shaped lip or flange 82, a mounting hole 84 is located. Two mounting bolts 86 extend through the mounting holes 84 into corresponding threaded holes, not shown, located in the support member 78 of the track roller frame 16 to secure the flanged bearing support 25 thereto. Four threaded holes 88 are tapped through the lip or flange 82, one on either side of each hole 84. The threaded holes 88 are for use during disassembly of the bearing support 25 as will be described in more detail hereinafter.

A bore 90 extends through the cylindrical portion 68 of the flanged bearing support 25 and has a diameter which is slightly larger than the outer diameter of the push rod 54. A pair of seal recesses 92 are located at the opposite ends of the cylindrical portion 68 adjacent to the ends of the bore 90. Seals 94 are seated in the seal recesses 92 and seal between the cylindrical portion 68 of the bearing support 25 and the outer surface of the push rod 54. A pair of sleeve bearings 96 are press fitted in bore 90 and have a sliding fit with rod 54. With the flanged bearing support 25 mounted on the push rod 54, the push rod 54 is free to travel in a longitudinal direction inside the bearings 96 and seals 94 and the equalizer bar 14 is free to rotate about the common axis of the push rod 54 and the cylindrical portion 68 of the bearing support 25.

A threaded support plate 98, FIG. 3, and a bulkhead 100, both generally of circular construction, co-operate to secure the flanged bearing support 25 to the support member 78 of the track roller frame 16. The threaded support plate 98 has a threaded bore 102 extending therethrough. The threaded support plate 98 is threaded to a threaded portion 104 of the cylindrical portion 68 of the bearing support 25.

An abutment shoulder 106 is formed on the threaded support plate 98 and extends axially away from the end of the threaded bore 102 to abut one end of an inner ring 108 of a resilient seal assembly 110. The other end of the inner ring 108 abuts against the inner race 66 of the spherical bearing 24. The flanged bearing support 25 has an abutment shoulder 112 abutting one end of a second inner ring 108 of a second resilient seal assembly 110. The other end of the second inner ring 108 abuts the opposite end of the inner race 66. The support plate 98, threaded on the cylindrical portion 68, traps the first and second inner rings 108 of the seal assemblies 110 and the inner raceway 66 between the shoulder 106 on the threaded support plate 98 and the shoulder 112 on the flanged bearing support 25. The seal assemblies 110 include a rubber ring 114 bonded to the inner ring 108 and to an outer ring 116. The outer rings 116 are seated in recesses 118 in the equalizer bar 14 and in the end cap 26 bolted to the end of the equalizer bar. The inner rings 108 of the seal assemblies 110 and the inner raceway 66 of the bearing 24 are press fitted on the outer surface of the cylindrical portion 68.

The threaded support plate 98 has an axially tapered outer surface or circumference 120, which surface 120 tapers toward the axis of the support plate 98 and in a direction away from the abutment shoulder 106. Bolt holes 122 pass through the threaded support plate 98 along axes substantially parallel to the axis of the plate 98.

The bulkhead 100 has an axial bore 124 extending through its center and has threaded bolt holes 126 equal in number and alignable with the bolt holes 122 in the threaded support plate 98. Extending axially from a face 128, FIG. 6, of the bulkhead 100 is a flanged or ring portion 130 which has a radially inner facing surface 132 and a radially outer facing surface 134. The inner facing surface 132 of the ring portion 130 is tapered radially outwardly away from the face 128. The cylindrical outer facing surface 134 lies substantially perpendicular to the face 128 of the bulkhead 100 and has a reduced diameter pilot portion 136 at the outer extremity of said outer facing surface 134 of the ring portion 130. Bolts 138 are used to secure the threaded support plate 98 to the bulkhead 100 by extending through the bolt holes 122 and being threaded into bolt holes 126. As the bolts 138 are tightened, the outer surface or circumference 120 of the threaded support plate 98 will wedge against the tapered innner facing surface 132 of bulkhead 100 to force the outer facing surface 134 of the bulkhead 100 securely against an inner facing contact surface 140 of an opening 142 in the support member 78. The bulkhead 100 has a radially extending collar 144 around the outer periphery thereof which is spaced axially from the pilot portion 136. The diameter of the collar 144 is larger than the diameter of the opening 142 so as to prevent the bulkhead 100 from passing through said opening 142.

For disassembly of the bearing support 25, the threaded support plate 98 and the bulkhead 100 from the support member 78 of the track frame 16, the bolts 138 and the bolts 86 are removed. Two or more bolts 146 (FIG. 3A) are threaded into threaded holes 88 and are screwed against support member 78 until the press fit between the peripheral surface 75 of bearing support 25 and the cylindrical opening 76 in the support member 78 and the wedged fit between the outer surface 120 of the threaded support plate 98 and the inner surface 132 of the bulkhead 100 break loose permitting the bearing support 25 and threaded support plate 98 to move relative to the support member 78 of the track frame 16. The bulkhead 100 remains in position with the outer facing surface 134 in the opening 142 in the support member 78. The bulkhead 100 acts as a stop against which the valve body 44 of the valve 42 on the piston 32 abuts to prevent the piston from becoming separated from the cylinder 34.

Figures 7, 8:
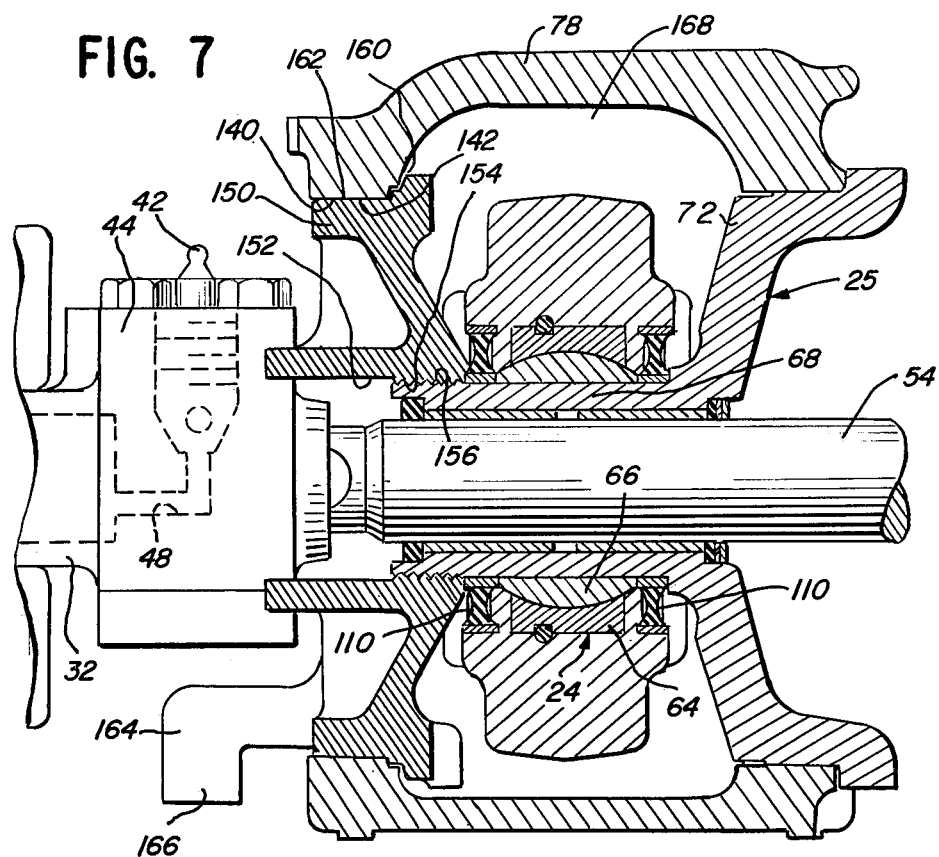
FIG. 7 is a side elevational view partially in section of a further embodiment of the present invention.
FIG. 8 is an end elevational view of the embodiment of FIG. 7.

Referring now to FIGS. 7 and 8, an alternative embodiment of the present invention is illustrated wherein like numerals refer to like structures of the two embodiments. In this embodiment, the bulkhead 100 and the threaded support plate 98 are replaced by a single support plate 150 which has a bore 152 extending throughout. The bore 152 is threaded with threads 154 which mate with the threads 156 on the cylindrical portion 68 of the flanged bearing support 25. An outer flange 160 and a radially outwardly facing outer surface 162 contact the inner facing contact surface 140 of the opening 142 in the support member 78. Integrally formed with the support plate 150 is a downwardly depending tang 164 which has a portion 166 extending in overlapping relationship to the support member 78 around the opening 142. The support plate 150 can be driven out of the opening 142 in the support member 78 by extending the piston 32 to move the valve body 44 of the valve 42 against the support plate 150 until the support plate 150 moves into an enlarged chamber 168 within the confines of the support member 78. The portion 166 of tang 164 engages the edge of the support member 78 around the opening 142 to limit complete removal of the support plate 150 from the support member 78.

INDUSTRIAL APPLICABILITY

Referring again to FIGS. 1 through 3, it is clear that the push rod 54 is movable longitudinally through the flanged bearing support 25 to maintain proper tensioning by the track roller frame 16. Furthermore, the equalizer bar 14 is able to pivot about the spherical bearing 24 mounted on the flanged bearing support 25 in response to movement over an uneven surface.

To replace or repair the bearings 24, 96 or seals 94, or other worn parts of the assembly of FIGS. 1 through 6, the push rod 54 is disconnected from the linkage 62 and is removed from the bearing support 25 by pulling axially forward therefrom. The bolts 28 are removed to release cap 26 from the equalizer bar 14 whereupon the equalizer bar 14 is separated from the track roller frame 16. The bolts 138 are then removed from the bulkhead 100. The bolts 86 are next removed from the flanged bearing support 25 and support member 78. Bolts 146 are then threaded in holes 88 through the lip 82 to bear against the support member 78. As the bolts 146 are extended, the bearing support 25 and the threaded support plate 98 are forced to the right to break and fit between the outer surface 120 of the plate 98 from surface 132 of bulkhead 100 and outwardly facing wall 74 from opening 76 of member 78. The bearing support 25, seal assemblies 110, bearing 24, and threaded support plate 98 are then removed as a unit from within member 78. The threaded support plate 98 is then unthreaded from the cylindrical portion 68 of bearing support 25 whereupon the seal assemblies 110, and bearing 24 may be removed and serviced as required. Support plate 98 need not be unthreaded for service of seals 94 or bearings 96.

The device is then reassembled by threading the support plate 98 on the cylindrical portion 68 with the seal assemblies 110 and bearing 24 between the support plate 98 and the cup-shaped portion 70 of the bearing support 25. The support plate 98 is moved through the opening 76 in the support member 78 until the bearing support 25 approaches the opening 76. The pilot portion 80 on the bearing support 25 guides the bearing support 25 into the opening 76. The bolts 86 are threaded through the lip or flange 82 and into the support member 78 and are tightened. If the bulkhead 100 had been removed, the pilot portion 136 is used to guide the bulkhead 100 into the opening 142 with the threaded bolt holes 126 in the bulkhead 100 aligned with the bolt holes 122 in the threaded support plate 98 whereupon bolts 138 are inserted in the bolt holes 122 and are threaded into the openings 142. In the event the bulkhead 100 was left in the opening 142, it may be necessary to turn it some relative to the support member 78 in order to align the threaded bolt holes 126 with the bolt holes 122 in the support plate 98. As the bolts 138 are drawn up tight, the bulkhead 100 and support plate 98 are reseated in the opening 142 in the support member 78 as aforesaid. The equalizer bar 14 is then reassembled with the roller frame 16 by being engaged over the spherical bearing 24 on the bearing support 25 whereupon the cap 26 is bolted thereto by bolts 28.

Referring to FIGS. 7 and 8, the bearing support 25 and support plate 150 are shown assembled within the support member 78. To disconnect the three parts after the equalizer bar 14 has been disconnected from the track roller frame 16, the bearing support 25 is unbolted from the support member 78. Grease, or the like, is pumped through valve 42 into the cavity 50 of the cylinder 34 to drive the piston 32 to the right, thereby engaging the valve body 44 of the valve 42 against the support plate 150. When sufficient pressure has been generated on the piston 32, the outwardly facing surface 162 of the support plate 150 will be separated from the inner facing contact surface 140 of the opening 142. The support plate 150 will be moved axially until the portion 166 of the tang 164 engages the support member 78 along the edge of opening 142. The pressure in the cylinder 34 is released. If the portion 166 of tang 164 is long, it will be necessary to unscrew the bearing support 25 from the support plate 150 before the bearing support 25, bearing 24, and seal assemblies 110 can be removed from the chamber 168 in the support member 78. If the portion 166 of the tang 164 is not too long, it will be possible to cant the bearing support 25 and the attached support plate 150 to clear the tang 164 through the opening 142 thereby removing the bearing support 25, bearing 24, seal assemblies 110 and support plate 150 as a unit. After the bearings and/or seals are serviced or replaced, the unit is reassembled in the support member 78 whereupon bolts 86 through flanges 82 in the bearing support and into the support member will, when drawn up tight, seat the support plate 150 and bearing support 25 in the support member 78 of the track frame 16.

Other aspects, objects and advantages of this invention can be obtained from a study of the drawings, the disclosure and the appended claims.

We claim:

1. In a vehicle having an equalizer bar (14) pivotally mounted through bearing means (24) to a track frame (16), an equalizer bar support assembly, comprising:

a flanged bearing support (25) having a cylindrical portion (68) and a flanged portion (70), said flanged portion (70) being secured to said track frame (16);

a support plate (98) secured to said cylindrical portion (68), said support plate (98) having a tapered outer circumferential surface (120); and a bulkhead (100) having an axially extending ring portion (130), said ring portion (130) having an axially tapered inner surface (132) and a cylindrical outer surface (134), said bulkhead (100) being secured to said support plate (98) with said tapered inner surface (132) abutting said tapered outer circumferential surface (120) of said support plate (98) and with said outer surface (134) contacting said track frame (16) to secure said support plate (98) and bulkhead (100) to said track frame (16).

2. The equalizer bar support assembly of claim 1, wherein said cylindrical portion (68) of the flanged bearing support (25) has a bore (90) therethrough, bearing means (96) seated in said bore (90), and seal means (94) seated in seal recesses (92) formed at the opposite ends of said bore (90) whereby a push rod (54) of a tensioning means of the track frame (16) is slidably received in said cylindrical portion (68).

3. The equalizer bar support assembly of claim 1, wherein said cylindrical portion (68) of said bearing support (25) has external threads (104) thereon, said support plate (98) has a threaded bore (102) therethrough, said threads (104) on said cylindrical portion (68) mating with said threaded bore (102) for securing said support plate (98) to said bearing support (25).

4. The equalizer bar support assembly of claim 3, wherein said support plate (98) is generally circular in cross section and includes at least two bolt holes (122) disposed on opposite sides of said bore (102).

5. The equalizer bar support assembly of claim 4, wherein said bulkhead (100) is generally circular in cross section and includes an equal number of threaded bolt holes (126) therethrough, and wherein bolts (138) pass through bolt holes (122) and are threaded into said bolt holes (126) for securing said bulkhead (100) to said support plate (98).

6. The equalizer bar support assembly of claim 1, wherein the outer surface (134) of the ring portion (130) extends substantially perpendicularly to said bulkhead (100), and wherein said outer surface (134) seats in an inwardly facing contact surface (140) formed in said track frame (16).

7. In a vehicle having an equalizer bar (14) pivotally mounted on bearing means (24) carried by a track frame (16), an equalizer bar support assembly, comprising:

a flanged bearing support (25) having a cylindrical portion (68) axially projecting from a flanged portion (70), said flanged portion (70) being mounted in said track frame (16);

support means (98,150) secured to said cylindrical portion (68) remote from said flanged portion (70), said support means (98,150) having means (120,162) operatively connected with said track frame (16) for securing said support means (98,150) to said track frame (16); and means (100,164) operatively associated with said support means (98,150) for limiting removal of said support means (98,150) from said track frame (16).

8. An equalizer bar support assembly as claimed in claim 7, wherein said last-named means (164) is a depending tang (164) formed integrally with said support means (150) and wherein said tang (164) overlaps a portion of said track frame (16) so as to engage said track frame (16) during removal of said support means (150).

9. The equalizer bar support assembly of claim 7, wherein said cylindrical portion (68) of said flanged bearing support (25) has a bore (90) therein, bearing means (96) seated in said bore (90), and seal means (94) seated in seal recesses (92) in said cylindrical portion (68).

10. In a vehicle having an equalizer bar (14) pivotally mounted through bearing means (24) to a track frame (16), a track tensioning means carried by said track frame (16) and having a rod portion (54) slidably mounted transverse to said equalizer bar (14), an equalizer bar support assembly, comprising:

a flanged bearing support (25) having a cylindrical portion (68), a flanged portion (70), and a bore (90) through said cylindrical portion (68) and through said flanged portion (70), bearing means (96) in said bore (90) for slidably receiving said rod portion (54) therethrough, a thread (104) on one end portion of said cylindrical portion (68), said flanged portion (70) being secured to said track frame (16);

a support plate (98) having a tapered outer surface (120) and having a threaded bore (102) mating with said threads (104) on said cylindrical portion (68) to secure said support plate (98) to said bearing support (25);

a circular bulkhead (100) having an axial face (128), a bore (124) in said bulkhead (100) through which said rod portion (54) extends, and an axially extending ring portion (130) located on and extending away from said face (128) and having a tapered inner surface (132) and an outer surface (134); and means (138) for securing said bulkhead (100) to said support plate (98) and to said track frame (16) by drawing said support plate (98) toward said bulkhead (100) to urge said outer surface (134) of said bulkhead (100) into retaining relationship with said track frame (16).

* * * * *